J. J. NELIS.
STEAM SEPARATOR.
APPLICATION FILED DEC. 31, 1919.

1,351,433.

Patented Aug. 31, 1920.

INVENTOR
Joseph J. Nelis,

BY his ATTORNEY

UNITED STATES PATENT OFFICE.

JOSEPH J. NELIS, OF BROOKLYN, NEW YORK.

STEAM-SEPARATOR.

1,351,433.

Specification of Letters Patent.  Patented Aug. 31, 1920.

Application filed December 31, 1919. Serial No. 348,614.

*To all whom it may concern:*

Be it known that I, JOSEPH J. NELIS, a citizen of the United States of America, and resident of Brooklyn, in the county of Kings and State of New York, have invented a certain new and useful Improvement in Steam-Separators, of which the following is a true and exact description, reference being had to the accompanying drawings, which form a part thereof.

My invention relates to steam separators of the kind employed for separating from the steam the entrained moisture which, in modern types of boilers, amounts to from 1 per cent. to 2 per cent., and the object of my invention is to provide a separator of ample area and in which no pressure drop, due to restricted steam passages, will take place in the separator and in which the direction of the steam flow is rapidly changed to effect the gravital separation of the water from the steam and in which effective provision is made for collecting the separated water by means which will prevent its being reëntrained by the steam.

The nature of my improvements will be best understood as explained in connection with the drawings in which they are illustrated and in which—

Figure 3:
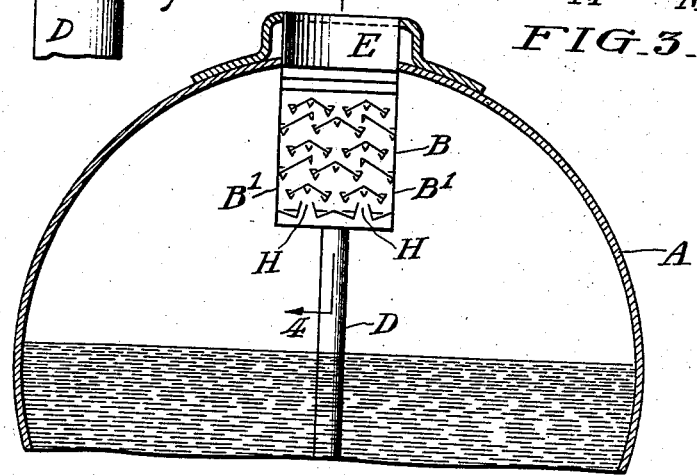
Figure 4:
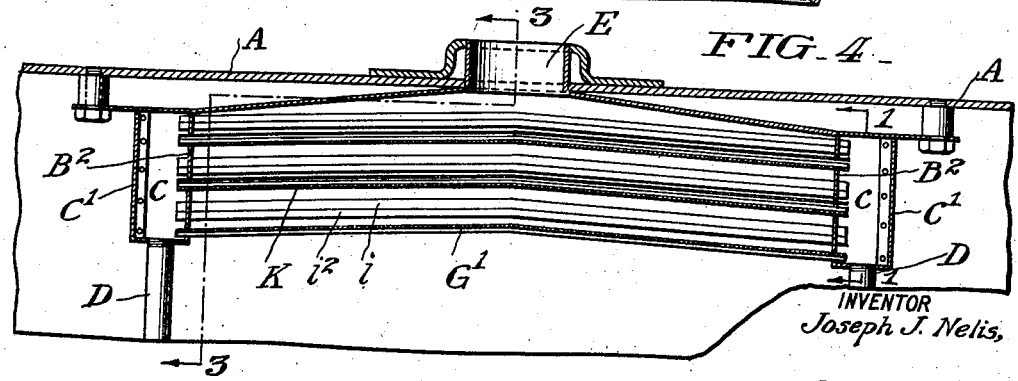

Fig. 3 an elevation taken through the boiler and separator in place therein as on the line 3—3 of Fig. 4, and Fig. 4 a longitudinal sectional elevation of the separator taken as on the line 4—4 of Fig. 3.

Figure 1:
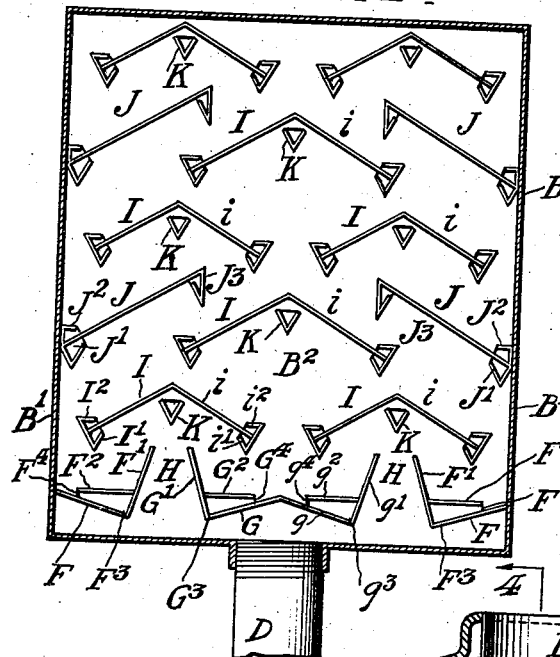
Figure 1 is a sectional elevation taken through one of the water collecting chambers as on the line 1—1 of Fig. 4.
Figure 2:
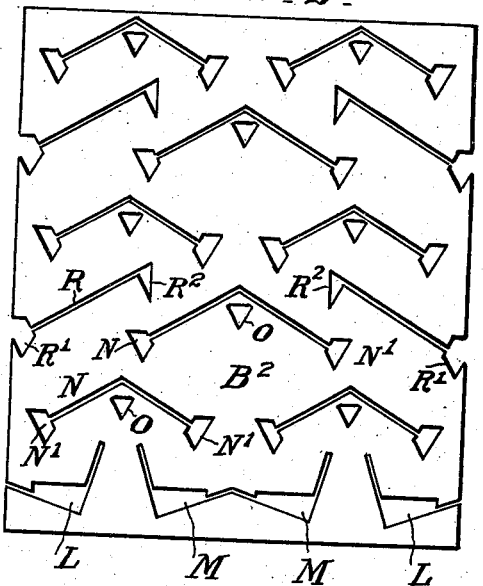
Fig. 2 is an elevation of one of the end walls of the separator chamber.

A indicates the boiler and B the separator chamber, which, as shown is a rectangular boxlike structure secured in the steam space at the top of the boiler and having side walls B', B' and end walls B² B², the end walls being, as shown in Fig. 2, slotted and cut away to give passage to the baffles and gutters. C, C, are water collecting chambers located at the ends of the separator B and communicating through passages D, with the water space of the boiler. By preference, the outer walls C' of the chamber C are made readily removable. E is the outlet passage from the separator and the boiler. I provide entrance passages from the steam space of the boiler to the bottom of the separator, as indicated at H, H; the bottom of the separator being made up of inclined plates F, F, and G, $g$, and the entrance passages H being bounded, as shown, by plates F', F' and G', $g'$. This formation of the bottom and entrance passages leaves gutters as indicated at F³, F³, and G³, $g^3$, which I prefer to partially cover by plates indicated at F², F² and G², $g^2$, and these gutters communicate with the end chambers C, C through passages L, L, and M, M, formed in the end walls B². The separator chamber is provided with a series of staggered baffle plates so disposed as to compel the passing steam to make many changes of direction passing from the bottom to the top of the separator, but so disposed also as to leave ample room for the body of steam passing through the separator to pass without pressure drop, and these baffles are inclined from edge to edge so that the water deposited upon them will be bound to run down toward their lower edges, and at the lower edges of the baffle plates, and preferably at the upper edges also, I provide gutters arranged to receive the water deposited on and running down upon the surfaces of the baffle plates, and by preference I also provide gutters on the under sides of the upper edges of such of the inclined baffle plates as do not at their upper edges contact with other inclined plates, and where such contacting inclined plates meet I preferably provide a gutter lying immediately below the apex formed by their contacting edges to receive any water which may, by the passing steam, be driven to such apex. The inclined baffle plates contacting at their upper edges are indicated at I and $i$, and the gutters formed at their lower edges are indicated at I², $i^2$. The baffles interposed with such contacting baffles are indicated at J and are provided with gutters J' and J² at their lower edges, and with gutters J³ at their upper edges, and K, K, etc., indicate gutters located immediately below the apices formed by the contacting plates I and $i$.

By preference, the end plates B² are slotted, as shown in Fig. 2, to give passage to the ends of the baffle plates, although, of course, it is not necessary that the plates should actually pass through these end plates, but in all cases passages are formed through the end plates for the gutters. Thus in Fig. 2 N indicates the slots formed for the plates I, i, and N', N' the openings formed for the gutters I', I² and i', i², O being openings for the passage of the gutters K. R indicates slots through which pass the end of the baffles J, R' being openings for the gutters J', J², and R² and opening for the gutter J³. By preference, the baffle plates are inclined not only from edge to edge but from end to end, and, conveniently, they may be inclined from the center of the separator chamber to the ends thereof, as indicated in Fig. 4.

In operation the steam enters the separator box through the openings H, H, and passes upward to the outlet opening E, having its direction rapidly and abruptly changed by its contact with the baffles in the separator; the water in the steam is deposited on the baffle plates and tends by gravity to run into the gutters on their lower inclined edges and such water as by the pressure of the steam is forced toward the top edges of the baffles is received in the gutters K or J³. Water in the gutters can and will pass through the gutters and through the openings in the end walls B² into the chamber C, and thence will pass through the pipes D to the water space of the boiler.

Having now described my invention, what I claim as new and desire to secure by Letters Patent, is:

1. A steam separator consisting of a chamber adapted to be secured in the steam space of a boiler and having openings for the admission of steam at its bottom and an opening for the delivery of steam at its top, in combination with a system of staggered baffle plates extending from end to end of the chamber and formed with water collecting gutters along their edges which gutters extend through an end wall of the chamber, a closed chamber into which said gutters communicate and a drain pipe leading from said chamber to a point below the water level of the boiler.

2. A steam separator consisting of a chamber adapted to be secured in the steam space of a boiler and having openings for the admission of steam at its bottom and an opening for the delivery of steam at its top, in combination with a system of staggered baffle plates extending from end to end of the chamber and formed with water collecting gutters along their edges which gutters extend through the end walls of the chamber, closed chambers into which said gutters communicate and drain pipes leading from said chambers to points below the water level of the boiler.

3. A steam separator consisting of a chamber adapted to be secured in the steam space of a boiler and having openings for the admission of steam at its bottom and an opening for the delivery of steam at its top, in combination with a system of staggered baffle plates extending from end to end of the chamber, said baffle plates being inclined from edge to edge and formed with water collecting gutters along their lower edges which gutters extend through an end wall of the chamber, a closed chamber with which said gutters communicate and a drain pipe leading from said closed chamber.

4. A steam separator consisting of a chamber adapted to be secured in the steam space of a boiler and having openings for the admission of steam at its bottom and an opening for the delivery of steam at its top, in combination with a system of staggered baffle plates extending from end to end of the chamber, said baffle plates being inclined from edge to edge and formed with water collecting gutters along their top and bottom edges which gutters extend through an end wall of the chamber, a closed chamber with which said gutters communicate and a drain pipe leading from said closed chamber.

5. A steam separator consisting of a chamber adapted to be secured in the steam space of a boiler and having openings for the admission of steam at its bottom and an opening for the delivery of steam at its top, in combination with a system of staggered baffle plates extending from end to end of the chamber, said baffle plates being inclined from end to end and from edge to edge and formed with water collecting gutters along their edges which gutters extend through an end wall of the chamber, a closed chamber with which said gutters communicate and a drain pipe leading from said closed chamber.

6. A steam separator consisting of a chamber adapted to be secured in the steam space of a boiler and having openings for the admission of steam at its bottom and an opening for the delivery of steam at its top, in combination with a system of staggered baffle plates extending from end to end of the chamber, said baffle plates being mainly in the form of inverted troughs, water collecting gutters extending along the edges of the baffle plates and through the end walls of the chamber, closed chambers into which said gutters open and drain pipes leading from said chamber to points below the water level of the boiler.

7. A steam separator consisting of a chamber adapted to be secured in the steam space of a boiler and having openings for the admission of steam at its bottom and an opening for the delivery of steam at its top, in combination with a system of staggered baffle plates extending from end to end of the chamber, said baffle plates being mainly in the form of inverted troughs, water collecting gutters extending along the edges of the baffle plates and through the end walls of the chamber, water collecting gutters located beneath the apex of the inverted troughs formed by the baffle plates, closed chambers into which all of the gutters open and drain pipes leading from said chambers to points below the water level of the boiler.

JOSEPH J. NELIS.